UNITED STATES PATENT OFFICE.

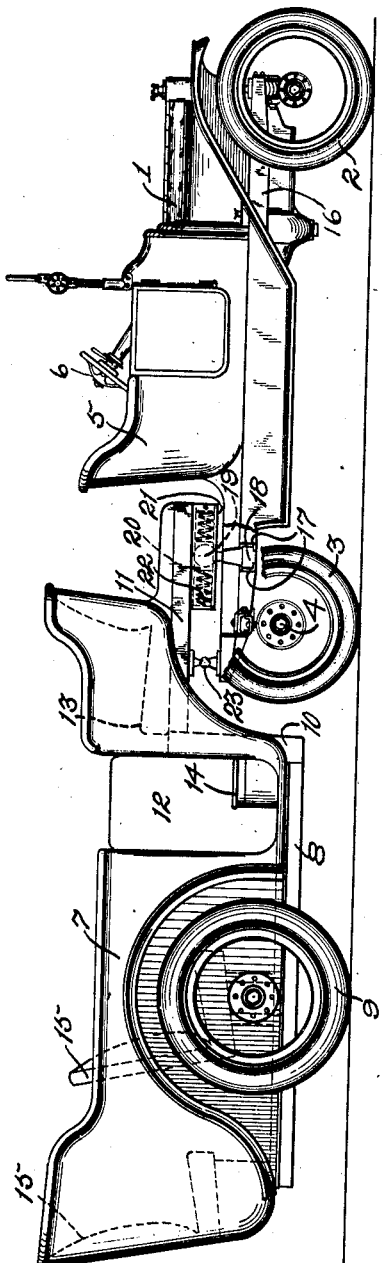

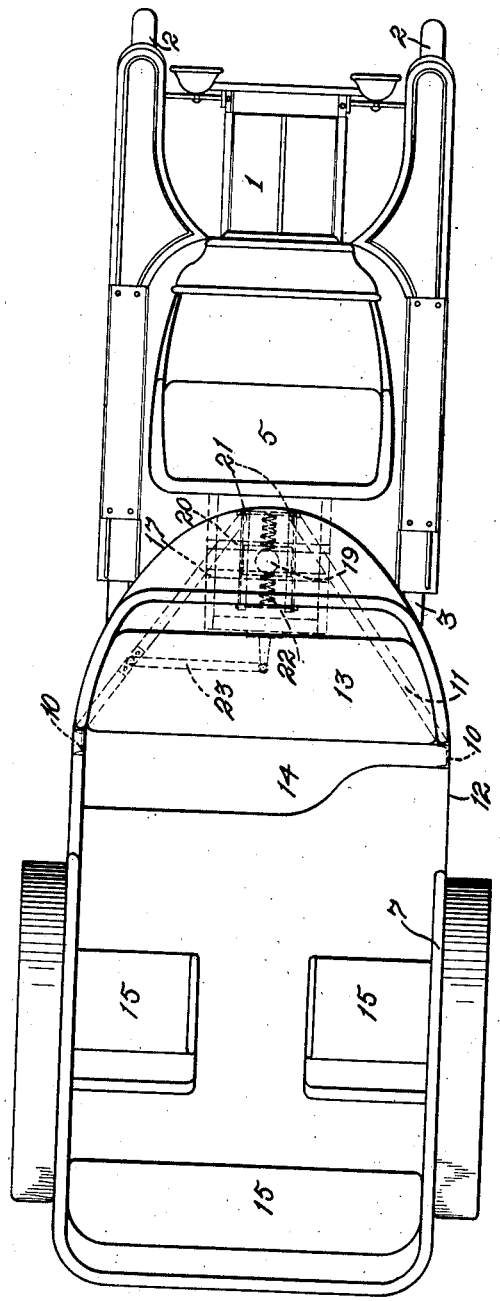

ROLLIE B. FAGEOL, OF OAKLAND, CALIFORNIA.

FLEXIBLE VEHICLE.

1,226,958.          Specification of Letters Patent.          Patented May 22, 1917.

Application filed January 3, 1916. Serial No. 69,935.

*To all whom it may concern:*

Be it known that I, ROLLIE B. FAGEOL, a citizen of the United States, residing at Oakland, in the county of Alameda and State of California, have invented certain new and useful Improvements in Flexible Vehicles, of which the following is a specification.

This invention relates to passenger carrying vehicles designed primarily for city use where it is desired to easily and quickly receive, transport, and discharge a number of passengers.

The invention has for its principal objects to provide a passenger carrying vehicle of large capacity and which is capable of being partly supported and drawn by a suitable motor vehicle of any well known light type now on the market; to provide one constructed in such a manner that the operator of the motor vehicle is enabled to collect the fares of the passengers in the passenger carrying vehicle, thereby requiring but a single operator for both the passenger and motor vehicles; one so constructed and arranged as to insure the passenger carrying vehicle to follow the motor vehicle in whichever direction the same is steered, and one wherein the passenger carrying vehicle is so constructed as to permit the boarding of or alighting from the same directly from the street curb if desired.

The invention consists broadly in providing a passenger carrying vehicle comprising two members, one a motor or power member and the other a passenger carrying member, and to pivotally and yieldably connect the two members with the forward end of the passenger carrying member overhanging and supported by the rear of the motor member, while the remaining part of the passenger carrying member is substantially parallel with the ground surface and in close proximity therewith and is provided with a passage for the entrance and exit of the passengers.

With the above mentioned and other objects in view, the invention consists in the novel construction and combination of parts hereinafter set forth, illustrated in the accompanying drawings, and pointed out in the claims hereto appended; it being understood that various changes in the form, proportion, size and minor details of construction within the scope of the claims may be resorted to without departing from or sacrificing any of the advantages of the invention.

To more fully comprehend the invention, reference is directed to the accompanying drawings, wherein—

Figure 1 is a view in side elevation of the preferred embodiment of my invention, disclosing the motor and passenger carrying vehicles flexibly connected, and the forward end of the passenger carrying vehicle resting on and supported by the motor vehicle.

Fig. 2 is a view in top plan, disclosing more fully the entrance and seating arrangement of the passenger carrying vehicle and the yieldable supporting and steering connection between the same and the rear of the motor vehicle.

Referring more particularly to the several views of the drawings, wherein like characters of reference designate corresponding parts, the vehicle comprises a motor member 1 having the front steering and supporting wheels 2 and the rear supporting and driving wheels 3 carried by the rear axle 4. The vehicle 1 is provided with the operator's seat 5 and suitable steering and controlling mechanism 6 in proximity thereto.

The passenger carrying member comprises a body 7 carried by the frame 8, which is supported by the single pair of wheels 9, which are positioned preferably in rear of the transverse center of the frame 8 and support the main portion of the frame a slight distance above the road surface.

The forward end of the frame 8 is bent upwardly as at 10 at right angles to the main portion thereof, and thence outwardly as at 11 at right angles to the portion 10, thus providing a raised portion for extending over the rear end of the motor member 1. The frame of the passenger carrying member as constructed permits of the main portion of the passenger carrying member or vehicle to lie substantially parallel with the ground or road surface in close proximity therewith and permits the forward end thereof to rest on and be supported by the motor member or vehicle.

The body 7 of the passenger carrying member is provided at one side and preferably at a point immediately in rear of the upwardly bent portion 10 of the frame with a passage 12, which permits the entrance to and exit of passengers to the body of the vehicle. A seat 13 extends transversely of the vehicle body, and the same rests on the upper raised portion of the vehicle, and a transversely extending step 14 permits of easy access thereto. The seat 13 faces other forwardly facing seats 15 in the vehicle body, one of which extends preferably across the entire rear end of the body 7. The rear portion of the frame 16 of the motor member 1 is provided with transversely extending opposed channels 17 spaced a slight distance from each other and between which is slidably mounted the base 17 of a vertically disposed pivot member 18 having an enlarged bearing head 19. The bearing head is received in a suitable bearing block 20 provided with a suitable opening for the reception of the head, and said block is slidably supported between longitudinally disposed parallel spaced guide rails 21 carried by the raised portion 11 of the frame 8. Oppositely disposed springs 22 maintain the block centrally of its guide rails 21 and provide a yieldable connection between the forward end of the passenger carrying member and the rear end of the motor member.

A suitable reach rod or steering link 23 pivotally connects the portion 11 of the frame 8 with the frame 16 in rear of the rear axle 4 and causes the bearing block 20 to slide relatively to the frame 16 to cause the passenger carrying member to follow or trail in the path of the motor member.

The forward end of the passenger carrying vehicle projects over and is supported on the rear of the motor member. The springs 22 absorb any sudden shocks transmitted to the passenger carrying member, due to the sudden starting or stopping of the motor member and provide a yielding connection between the two members. By providing the passage for the entrance and exit of passengers adjacent the front of the passenger carrying member and at one side thereof, the operator of the motor vehicle is enabled without leaving the driver's seat, to collect the fares of passengers and receive and discharge passengers directly at the curb.

Having thus described my invention, what I claim as new and desire to protect by Letters Patent is:—

1. In combination with a passenger carrying vehicle trailer member comprising a body, the floor of which is adapted to be reached by a single step from the road surface, a supporting frame therefor extending substantially parallel with the road surface with the rear end in close proximity therewith, a single pair of supporting wheels adjacent the rear end thereof, the forward end of said frame extending substantially parallel with the rear thereof and in a plane above the same to provide a raised substantially horizontal portion adapted for projecting over and resting on a coöperating self propelled vehicle, said body provided at one side and at a point immediately in the rear of said substantially horizontal raised portion with an entrance and exit passage, and a passenger seat extending transversely within the body above and resting on said substantially horizontal raised portion of the frame, an independent wheeled motor member to which said passenger carrying vehicle member is pivotally connected, and an intersteering connection interposed between said members whereby the trailer member is caused to track with the motor member.

2. A passenger carrying vehicle comprising a motor member having steering and supporting wheels and a body for carrying an operator, a passenger carrying member detachably secured thereto through a pivotal connection, said passenger carrying member comprising a body, the floor of which is adapted to be reached by a single step from the road surface, a supporting frame therefor and extending substantially parallel with the road surface with the rear end in close proximity therewith, a single pair of supporting wheels adjacent the rear end of said frame, the forward end of said frame extending substantially parallel with the rear thereof and in a plane above the same to provide a raised substantially horizontal portion adapted for projecting over and resting on the rear of the motor member, said body provided at one side and at a point immediately in rear of the substantially horizontal raised portion with an entrance and exit passage enabling passengers entering the said passenger carrying member or alighting therefrom, to readily pass their fare to the vehicle operator while passing through said entrance or exit passage, and an inter-steering connection between the motor and the passenger carrying members, whereby the passenger carrying member is caused to travel in the path of the motor member.

3. A vehicle comprising a motor member having steering and supporting wheels and a passenger carrying member associated therewith, said passenger carrying member comprising a body member provided with seats and an entrance opening, a supporting frame therefor, a single pair of supporting wheels adjacent one end thereof, the forward end of said frame projecting over and resting on the motor member, a yieldable supporting connection between the motor and passenger carrying members, and a transversely extending steering link connecting the motor and passenger carrying members.

4. A vehicle comprising a motor member having steering and supporting wheels and a passenger carrying member associated therewith, said passenger carrying member comprising a body member provided with seats and an entrance opening, a supporting frame therefor, a single pair of supporting wheels adjacent one end thereof, the forward end of said frame projecting over and resting on the motor member, a pivot member projecting upwardly from the motor member and slidable transversely thereof, a bearing block carried by said frame and movable longitudinally thereof for receiving said pivot member, a tension spring on each side of said bearing block and a transversely extending pivoted link connecting said frame and the motor member in rear of said pivot member.

5. A vehicle comprising a motor member having steering and supporting wheels and a passenger carrying member associated therewith, said passenger carrying member comprising a body member provided with seats and an entrance opening, a supporting frame therefor, a single pair of supporting wheels adjacent one end thereof, the forward end of said frame projecting over and resting on the motor member, a supporting connection between the motor and passenger carrying members, said connection permitting transverse and longitudinal movement of the relative overlapping portions of the two vehicle members, and a transversely disposed steering link pivotally connected to both vehicle members in rear of said supporting connection.

6. A vehicle comprising a motor member having steering and supporting wheels and a passenger carrying member associated therewith, said passenger carrying member comprising a body member provided with seats and an entrance opening, a supporting frame therefor, a single pair of supporting wheels adjacent one end thereof, the opposite end of said frame being bent upwardly providing a forwardly projected overhanging portion adapted to overlie and rest on a coöperating vehicle member, and a pivotal connection interposed between the said overhanging portion and the rear of the motor vehicle member, said pivotal connection being capable of transverse movement relatively to the rear of the motor vehicle member and also capable of longitudinal movement under tension relatively to the forwardly projecting overhanging portion of the passenger carrying vehicle frame.

7. A vehicle comprising a motor member having steering and supporting wheels and a passenger carrying member associated therewith, said passenger carrying member comprising a body member provided with seats and an entrance opening, a supporting frame therefor, a single pair of supporting wheels adjacent one end thereof, the forward end of said frame projecting over and resting on the motor member, and a steering link pivotally connecting said motor and passenger carrying members whereby the passenger carrying member is caused to travel in the path of the motor member.

In testimony whereof I have signed my name to this specification in the presence of two subscribing witnesses.

ROLLIE B. FAGEOL.

Witnesses:
　HARRY H. TOTTEN,
　D. B. RICHARDS.